US011361951B2

(12) United States Patent
Mackay

(10) Patent No.: US 11,361,951 B2
(45) Date of Patent: Jun. 14, 2022

(54) SYSTEM AND METHOD FOR PHOTOMULTIPLIER TUBE IMAGE CORRECTION

(71) Applicant: KLA Corporation, Milpitas, CA (US)

(72) Inventor: Derek Mackay, Palo Alto, CA (US)

(73) Assignee: KLA Corporation, Milpitas, CA (US)

( * ) Notice: Subject to any disclaimer, the term of this patent is extended or adjusted under 35 U.S.C. 154(b) by 17 days.

(21) Appl. No.: 17/031,327

(22) Filed: Sep. 24, 2020

(65) Prior Publication Data

US 2021/0104388 A1 Apr. 8, 2021

Related U.S. Application Data

(60) Provisional application No. 62/910,175, filed on Oct. 3, 2019.

(51) Int. Cl.
H01J 43/30 (2006.01)
H01J 43/08 (2006.01)
H01J 43/18 (2006.01)
H01J 43/12 (2006.01)
G06T 5/00 (2006.01)
G01N 21/95 (2006.01)
G01N 21/88 (2006.01)
G06T 5/50 (2006.01)

(52) U.S. Cl.
CPC .......... H01J 43/30 (2013.01); G01N 21/8806 (2013.01); G01N 21/9501 (2013.01); G06T 5/003 (2013.01); G06T 5/50 (2013.01); H01J 43/08 (2013.01); H01J 43/12 (2013.01); H01J 43/18 (2013.01); G01N 2021/8822 (2013.01); G06T 2207/20224 (2013.01); G06T 2207/30148 (2013.01)

(58) Field of Classification Search
None
See application file for complete search history.

(56) References Cited

U.S. PATENT DOCUMENTS 7,436,508 B2 * 10/2008 Wolters .................. G01N 21/47
356/237.4
2005/0253512 A1 11/2005 McAlpine
(Continued)

OTHER PUBLICATIONS

PCT International Search Report and Written Opinion for International Application No. PCT/US2020/053664 dated Dec. 24, 2020, 10 pages.

Primary Examiner — Ashok Patel
(74) Attorney, Agent, or Firm — Suiter Swantz pc llo

(57) ABSTRACT

A photomultiplier tube (PMT) detector assembly includes a PMT and an analog PMT detector circuit. The PMT includes a photocathode configured to emit an initial set of photoelectrons in response to an absorption of photons. The PMT includes a dynode chain with a plurality of dynodes. The dynode chain is configured to receive the initial set of photoelectrons, generate at least one amplified set of photoelectrons, and direct the at least one amplified set of photoelectrons. The PMT includes an anode configured to receive the at least one amplified set of photoelectrons, with a digitized image being generated based on a measurement of the final amplified set of photoelectrons. The digitized image is corrected by applying an output of the signal measured by the analog PMT detector circuit to the digitized image.

34 Claims, 8 Drawing Sheets

(56) References Cited

U.S. PATENT DOCUMENTS

| | | |
|---|---|---|
| 2013/0264464 A1 | 10/2013 | Heifets et al. |
| 2016/0379809 A1 | 12/2016 | Badiei et al. |
| 2017/0287686 A1 | 10/2017 | Mackay |
| 2018/0066986 A1 | 3/2018 | Kasai et al. |

* cited by examiner

SYSTEM AND METHOD FOR PHOTOMULTIPLIER TUBE IMAGE CORRECTION

CROSS-REFERENCE TO RELATED APPLICATIONS

The present application claims the benefit under 35 U.S.C. § 119(e) of U.S. Provisional Patent Application Ser. No. 62/910,175, filed Oct. 3, 2019, titled PHOTOMULTIPLIER IMAGE SHARPENING USING A LAPLACIAN OPERATOR IN ANALOG SPACE, naming Derek Mackay as inventor, which is incorporated herein by reference in the entirety.

TECHNICAL FIELD

The present invention in general relates to photomultiplier tube detectors, and, more particularly, to a system and method for photomultiplier image correction.

BACKGROUND

As demand for semiconductor devices increase the need for improved device characterization capabilities will also continue to increase. One technology commonly utilized in optical characterization methodologies includes the implementation of a photomultiplier tube (PMT) detector. In a general sense, photomultiplier tube detectors are sensitive detectors of light in the UV, visible, and near-infrared ranges of the electromagnetic spectrum. Therefore, PMTs are widely utilized for semiconductor device characterization processes.

PMTs amplify very small light signals. When light hits a cathode of a PMT, a photoelectron is created and accelerated towards a receiving dynode. The receiving dynode then amplifies the photoelectrons and directs them towards a second dynode. This process continues through a series of dynodes until the amplified photoelectron signal is collected at an anode.

The bandwidth of the PMT is governed by a transit time spread (tts). If a delta function of light is incident on the cathode of the PMT, the time spread of collected electric charge at the anode is proportional to the PMT's bandwidth. The collection being at the anode means the bandwidth is limited by the spread of collected charge at the anode.

As such, it would be advantageous to provide a system and method to remedy the shortcomings of the approaches identified above.

SUMMARY

A detector assembly is disclosed, in accordance with one or more embodiments of the present disclosure. In one embodiment, the detector assembly includes a photomultiplier tube. In another embodiment, the photomultiplier tube includes a photocathode configured to absorb photons. In another embodiment, the photocathode is further configured to emit an initial set of photoelectrons in response to an absorption of the photons. In another embodiment, the photomultiplier tube includes a dynode chain. In another embodiment, the dynode chain includes a plurality of dynodes. In another embodiment, the dynode chain is configured to receive the initial set of photoelectrons. In another embodiment, the dynode chain is configured to generate at least one amplified set of photoelectrons from the initial set of photoelectrons. In another embodiment, the at least one amplified set of photoelectrons includes a greater number of photoelectrons than the initial set of photoelectrons. In another embodiment, the dynode chain is configured to direct the at least one amplified set of photoelectrons. In another embodiment, the photomultiplier tube includes an anode configured to receive the at least one amplified set of photoelectrons directed by the dynode chain. In another embodiment, the received at least one amplified set of photoelectrons are measured at the anode. In another embodiment, the digitized image is generated based on the measured at least one amplified set of photoelectrons. In another embodiment, the detector assembly includes an analog photomultiplier tube detector circuit configured to measure a signal of the dynode chain. In another embodiment, the analog photomultiplier tube detector circuit includes a capacitor operably coupled to at least one dynode of the plurality of dynodes. In another embodiment, the analog photomultiplier tube detector circuit includes an alternating current (AC)-coupled analog-to-digital converter (ADC) operably coupled to the capacitor. In another embodiment, the digitized image is corrected by applying an output of the signal measured by the analog photomultiplier tube detector circuit to the digitized image.

A characterization system is disclosed, in accordance with one or more embodiments of the present disclosure. In one embodiment, the characterization system includes an illumination source configured to illuminate a portion of a sample surface. In another embodiment, the characterization system includes a detector assembly. In another embodiment the detector assembly includes a photomultiplier tube. In another embodiment, the photomultiplier tube includes a photocathode configured to absorb photons. In another embodiment, the photocathode is further configured to emit an initial set of photoelectrons in response to an absorption of the photons. In another embodiment, the photomultiplier tube includes a dynode chain. In another embodiment, the dynode chain includes a plurality of dynodes. In another embodiment, the dynode chain is configured to receive the initial set of photoelectrons. In another embodiment, the dynode chain is configured to generate at least one amplified set of photoelectrons from the initial set of photoelectrons. In another embodiment, the at least one amplified set of photoelectrons includes a greater number of photoelectrons than the initial set of photoelectrons. In another embodiment, the dynode chain is configured to direct the at least one amplified set of photoelectrons. In another embodiment, the photomultiplier tube includes an anode configured to receive the at least one amplified set of photoelectrons directed by the dynode chain. In another embodiment, the received at least one amplified set of photoelectrons are measured at the anode. In another embodiment, a digitized image is generated based on the measured at least one amplified set of photoelectrons. In another embodiment the detector assembly includes an analog photomultiplier tube detector circuit configured to measure a signal of the dynode chain. In another embodiment, the analog photomultiplier tube detector circuit includes a capacitor operably coupled to at least one dynode of the plurality of dynodes. In another embodiment, the analog photomultiplier tube detector circuit includes an alternating current (AC)-coupled analog-to-digital converter (ADC) operably coupled to the capacitor. In another embodiment, the digitized image is corrected by applying an output of the signal measured by the analog photomultiplier tube detector circuit to the digitized image.

A detector assembly is disclosed, in accordance with one or more embodiments of the present disclosure. In one embodiment, the detector assembly includes a photomultiplier tube. In another embodiment, the photomultiplier tube includes a photocathode configured to absorb photons. In another embodiment, the photocathode is further configured to emit an initial set of photoelectrons in response to an absorption of the photons. In another embodiment, the photomultiplier tube includes a dynode chain configured to receive the initial set of photoelectrons. In another embodiment, the dynode chain includes a plurality of dynodes. In another embodiment, the plurality of dynodes includes an initial dynode. In another embodiment, the initial dynode is configured to receive the initial set of photoelectrons. In another embodiment, the initial dynode is configured to amplify the initial set of photoelectrons to generate a first amplified set of photoelectrons. In another embodiment, the first amplified set of photoelectrons includes a greater number of photoelectrons than the initial set of photoelectrons. In another embodiment, the plurality of dynodes includes at least one intermediate dynode. In another embodiment, the at least one intermediate dynode is configured to receive the first amplified set of photoelectrons. In another embodiment, the at least one intermediate dynode is configured to further amplify the first amplified set of photoelectrons to generate at least one intermediate amplified set of photoelectrons. In another embodiment, the at least one intermediate amplified set of photoelectrons includes a greater number of photoelectrons than the first amplified set of photoelectrons. In another embodiment, the plurality of dynodes includes a final dynode. In another embodiment, the final dynode is configured to receive the at least one intermediate amplified set of photoelectrons. In another embodiment, the final dynode is configured to further amplify the at least one intermediate amplified set of photoelectrons to generate a final amplified set of photoelectrons. In another embodiment, the final set of photoelectrons includes a greater number of photoelectrons than the at least one intermediate amplified set of photoelectrons. In another embodiment, the photomultiplier tube includes an anode configured to receive the final amplified set of photoelectrons directed by the final dynode from the dynode chain. In another embodiment, the received final amplified set of photoelectrons is measured at the anode. In another embodiment, a digitized image is generated based on the measured final amplified set of photoelectrons. In another embodiment, the detector assembly includes an analog photomultiplier tube detector circuit configured to measure a signal of the dynode chain. In another embodiment, the analog photomultiplier tube detector circuit includes a capacitor operably coupled to the at least one intermediate dynode. In another embodiment, the analog photomultiplier tube detector circuit includes an alternating current (AC)-coupled analog-to-digital converter (ADC) operably coupled to the capacitor. In another embodiment, the digitized image is corrected by applying an output of the signal measured by the analog photomultiplier tube detector circuit to the digitized image.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure. Reference will now be made in detail to the subject matter disclosed, which is illustrated in the accompanying drawings.

Referring in general to FIGS. 1A-6, a system and method for photomultiplier image correction is described, in accordance with one or more embodiments of the present disclosure.

Digital image processing techniques may be used on a final, digitized image taken by a characterization system including a photomultiplier tube (PMT) detector. The bandwidth of the PMT is governed by a transit time spread (tts). If a delta function of light is incident on the cathode of the PMT, the time spread of collected electric charge at the anode is proportional to the PMT's bandwidth. The collection being at the anode means the bandwidth is limited by the spread of collected charge at the anode. For example, increasing a throughput speed through the PMT may wash out the digitized images taken at the anode.

One digital image processing technique includes applying a Laplacian operator to the final digitized image, to bring out additional fine details of the digitized image. EQ. 1 illustrates the Laplacian of a function f:

$$\Delta f = \sum_{i=1}^{n} \frac{\partial^2 f}{\partial x_i^2} \qquad \text{EQ. 1}$$

A sharper version of the digitized image may be generated by subtracting the Laplacian from the original image, as illustrated in EQ. 2:

$$f_{sharpened} = f_{original} - \beta \Delta f \qquad \text{EQ.2}$$

It is noted herein, however, that a corrected version of the digitized image may be generated by any number or type of mathematical operation including, but not limited to, multiplying.

Figures 1A, 1B, 1C:
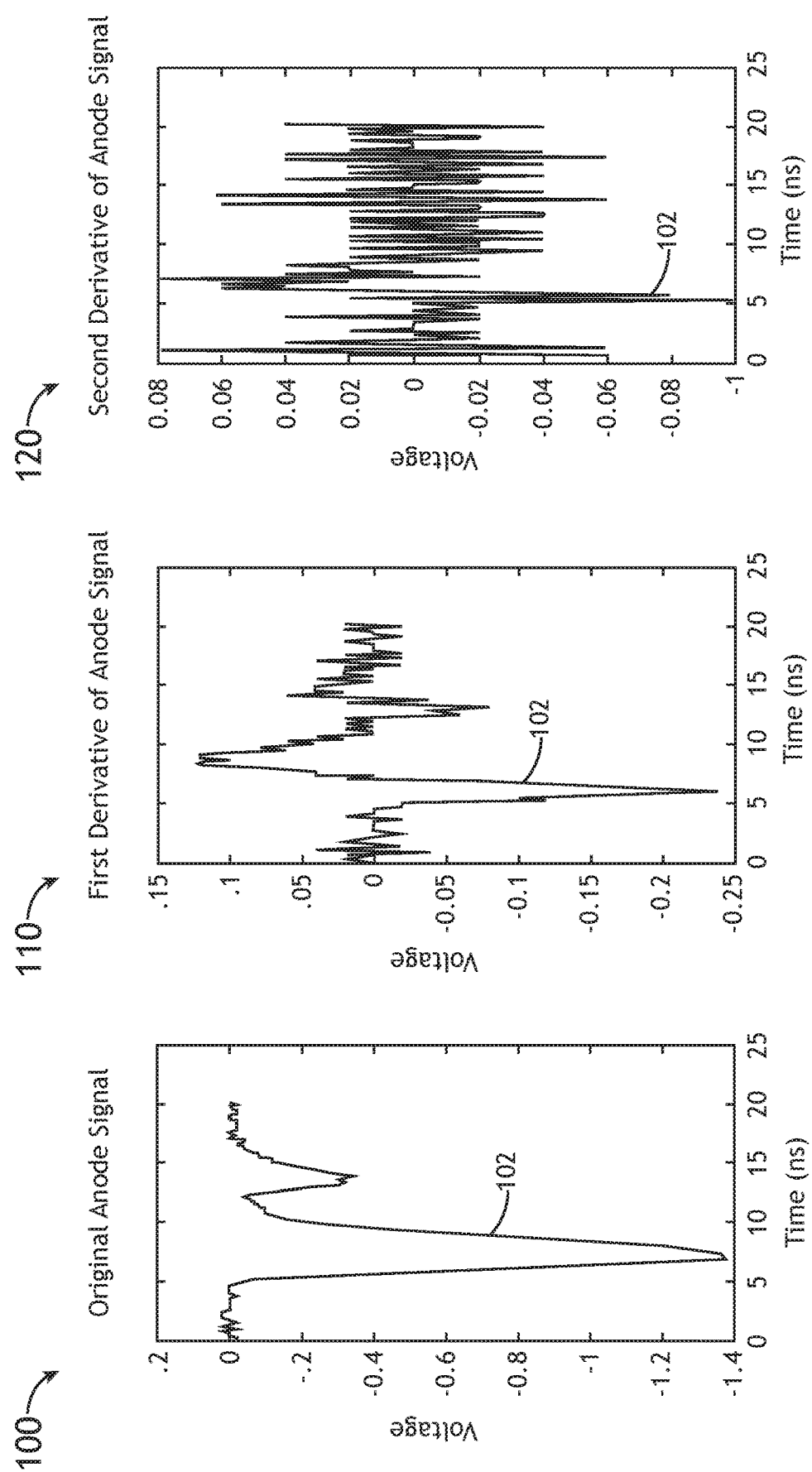
FIG. 1A is a graph illustrating a signal measured at an anode as a function of voltage versus time, in accordance with one or more embodiments of the present disclosure.
FIG. 1B is a graph illustrating a signal measured at an anode as a function of voltage versus time, in accordance with one or more embodiments of the present disclosure.
FIG. 1C is a graph illustrating a signal measured at an anode as a function of voltage versus time, in accordance with one or more embodiments of the present disclosure.

One trade-off of obtaining additional fine details to the digitized image and/or correcting (e.g., including, but not limited to, sharpening) the digitized image includes the addition or increase of noise into the processed digitized image. FIGS. 1A-1C illustrate the results of processing digitized images with the Laplacian. For instance, FIG. 1A is a graph 100 illustrating a signal 102 measured at an anode (e.g., the original signal), as a function of voltage (V) versus time (in nanoseconds (ns)). In addition, FIG. 1B is a graph 110 illustrating a first derivative of the signal 102, as a function of voltage (V) versus time (ns). Further, FIG. 1C is a graph 120 illustrating a second derivative of the signal 102, as a function of voltage (V) versus time (ns). As understood based on a comparison of FIGS. 1A-1C, each taking of the derivative of the signal 102 introduces additional noise into the signal 102, and thus the digitized image. In this regard, taking the Laplacian of the digitized image is not enough by itself to improve bandwidth of the PMT, without adding an unmanageable amount of noise.

Embodiments of the present disclosure are directed to a PMT detector assembly having a higher bandwidth, leading to an increased throughput of a characterization system without degrading resolution. Embodiments of the present disclosure are also directed to taking measurements at a dynode of the PMT detector. Embodiments of the present disclosure are also directed to the measurement at the dynode of the PMT detector allowing for image correction via a Laplacian operator in analog space.

Figure 2A:
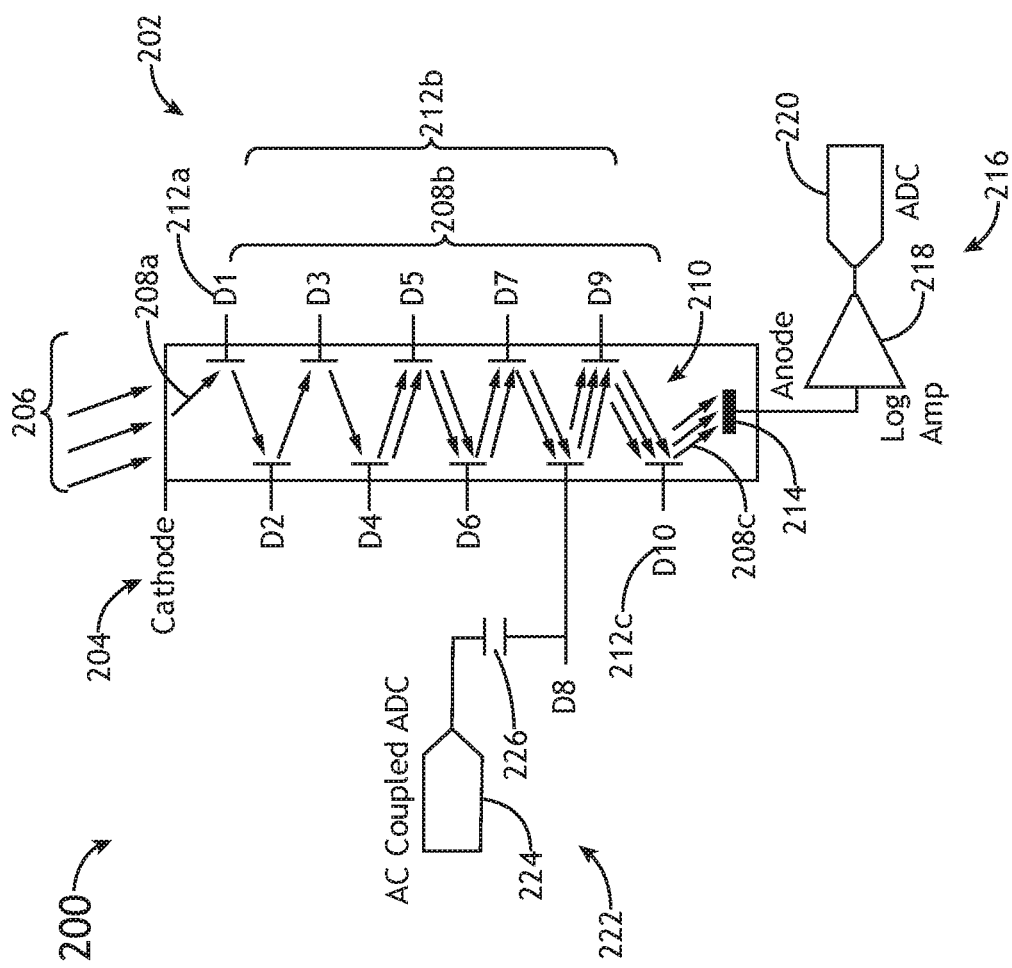
FIG. 2A illustrates a simplified schematic view of a photomultiplier tube detector assembly including a Laplacian operator in analog space, in accordance with one or more embodiments of the present disclosure.
Figure 2B:
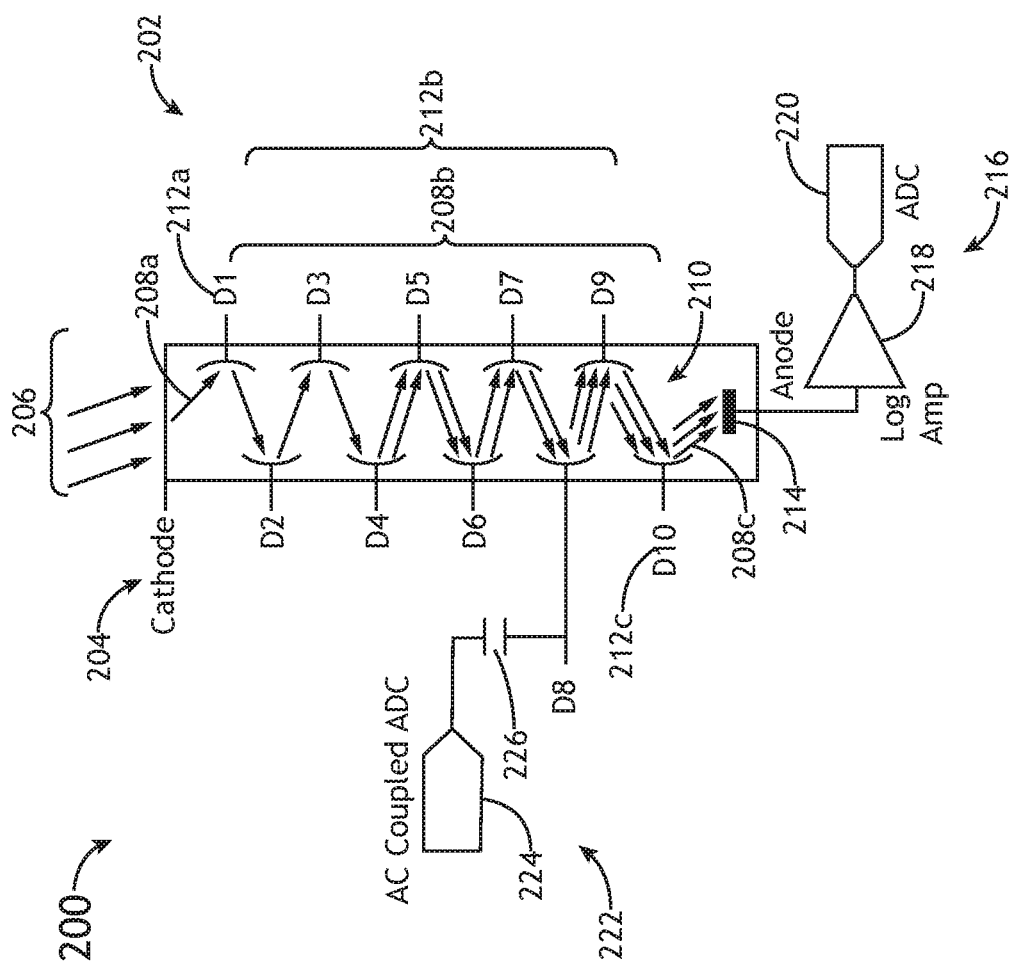
FIG. 2B illustrates a simplified schematic view of a photomultiplier tube detector assembly including a Laplacian operator in analog space, in accordance with one or more embodiments of the present disclosure.
Figure 2C:
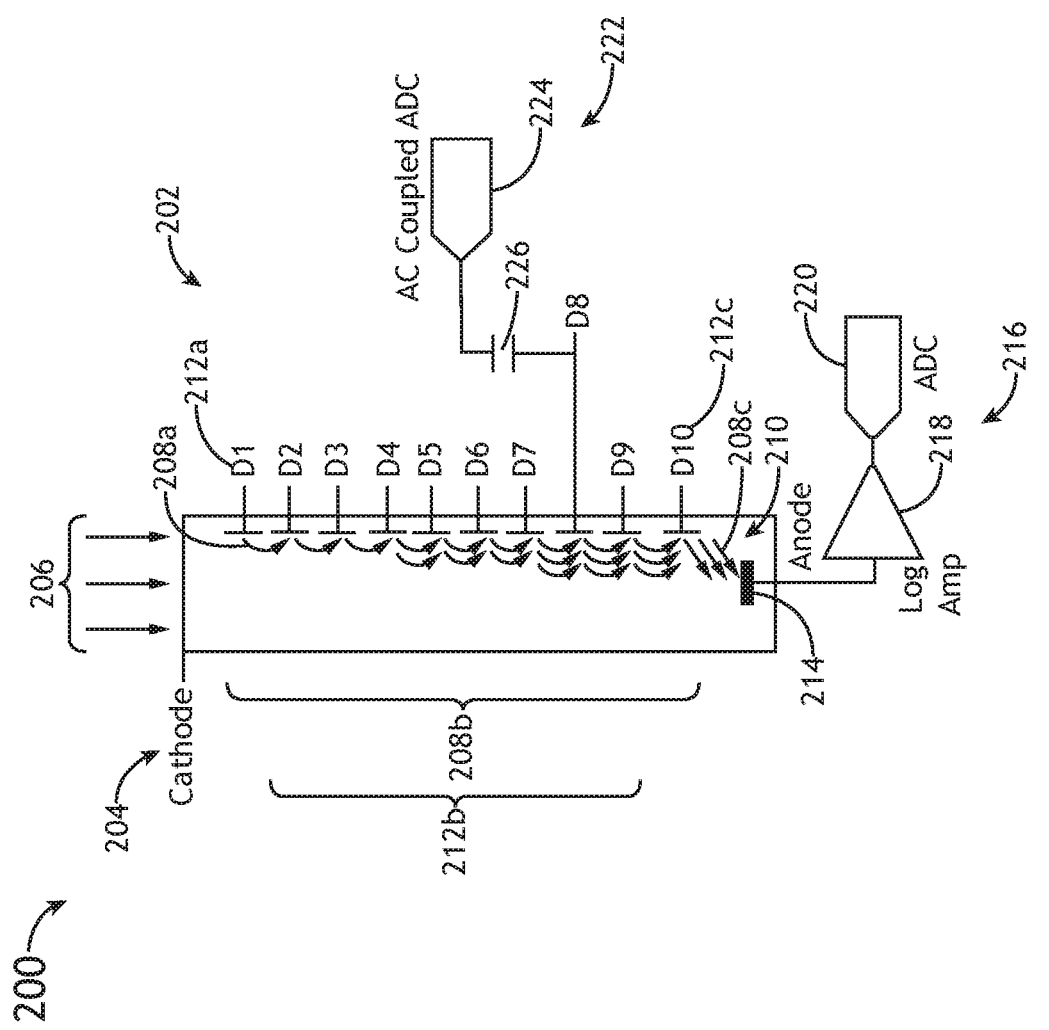
FIG. 2C illustrates a simplified schematic view of a photomultiplier tube detector assembly including a Laplacian operator in analog space, in accordance with one or more embodiments of the present disclosure.

FIGS. 2A-C illustrate a simplified schematic view of a PMT detector assembly 200, in accordance with one or more embodiments of the present disclosure. It is noted herein that "PMT detector assembly" and variants of the term including, but not limited to, "detector assembly," "assembly," or the like may be considered equivalent, for purposes of the present disclosure.

In one embodiment, the assembly 200 includes a PMT 202. In another embodiment, the PMT 202 includes a photocathode 204. In one embodiment, the photocathode 204 absorbs one or more portions of photons 206 and then, in response to the absorption of the one or more portions of photons 206, emits one or more portions of photoelectrons 208. For example, the photocathode 204 may include a transmission-type photocathode suitable for absorbing photons 206 at one surface of the photocathode 204 and emitting photoelectrons 208 from the opposite surface of the photocathode 204. By way of another example, the photocathode 204 may include a reflective-type photocathode suitable for absorbing photons 206 at one surface and emitting photoelectrons 208 from the same surface of the photocathode 204. It is noted herein the photocathode 204 may be configured to absorb photons 206 from oblique incident angles and/or normal incident angles.

In another embodiment, the PMT 202 includes one or more dynodes in a dynode chain 210. For example, the dynode chain 210 may include a front dynode 212a configured to receive photoelectrons 208a emanating from the photocathode 204. For instance, the front dynode 212a may be configured to receive a single photoelectron 208a emanating from the photocathode 204. In another embodiment, the dynode chain 210 includes one or more dynodes 212b. For example, a first dynode 212b may be configured to amplify the photoelectron current 208a (e.g., via secondary emission) such that the photoelectron current 208b emanating from the first dynode 212b is larger than the current 208a (e.g., including a greater or increased number of photoelectrons 208b). By way of another example, at least one additional dynode 212b may further amplify the photoelectron current 208b as the current 208b passes through the dynode chain 210 of the PMT 202 and strikes the at least one additional dynode 212b. In general, the dynode chain 210 may include 1, 2, up to an N number of dynodes 212b to amplify the photoelectron current 208b to desired levels. In another embodiment, the dynode chain may include a rear dynode 212c, where the rear dynode 212c may be arranged to direct an amplified photoelectron current output 208c out of the dynode chain 210. It is noted herein that "dynode chain," dynode channel," and/or "bias chain" may be considered equivalent, for purposes of the present disclosure.

It is noted herein the dynode chain 210 may include a linear (or head-on) arrangement of dynodes (e.g., such that the PMT 202 is a head-on PMT), a circular (or side-on) arrangement of dynodes (e.g., such that the PMT 202 is a side-on PMT), or any other arrangement of dynodes. In addition, it is noted herein one or more of the dynodes 212a, 212b, 212c may include a flat surface, may include a surface curved in either a convex or concave direction, or may include multiple sections with a combination of flat and curved surfaces.

It is noted herein one or more of the dynodes 212a, 212b, 212c of the dynode chain 210 may be controlled via one or more of the voltages delivered to each dynode of the dynode chain 210, via resistance levels between dynodes of the dynode chain 210, and/or via capacitive levels between dynodes of the dynode chain 210.

It is noted herein the dynode chain 210 may be considered as including a photoelectron pathway through which the photoelectrons may pass when being directed by the dynodes 212a, 212b, 212c, for purposes of the present disclosure.

Although embodiments of the present disclosure illustrate at least some of the dynodes 212a, 212b, 212c as being configured to amplify the photoelectrons current 208a, 208b, 208c, it is noted herein at least some of the dynodes 212a, 212b, 212c may be configured to maintain the photoelectrons current 208a, 208b, 208c. However, it is noted herein the dynode chain 210 may only include dynodes 212a, 212b, 212c configured to amplify the photoelectrons passing through the dynode chain 210. Therefore, the above description should not be interpreted as a limitation on the scope of the present disclosure but merely an illustration.

In another embodiment, the PMT 202 includes an anode 214. For example, the anode 214 may be phosphor-coated. In another embodiment, the rear dynode 212c is arranged to direct an amplified photoelectron current output 208c out of the dynode chain 210 so as to impinge on the anode 214, such that the anode 214 acts as a collector.

In another embodiment, the anode 214 is configured to measure a signal of the dynode chain 210 downstream/after the one or more dynodes 212a, 212b, 212c. In another embodiment, a digitized image is generated by the anode 214 based on the measured signal of the dynode chain 210.

It is noted herein the anode 214 may be suitable for converting the photoelectron current 208c into one or more light signals. For example, the anode 214 may be energized by the one or more amplified photoelectron currents. In addition, it is noted herein the anode 214 may be coupled to one or more detectors. For example, the one or more detectors may include any detector known in the art, such as, but not limited to, a charge-coupled device (CCD) detector, or a complementary metal oxide-semiconductor (CMOS) detector.

Although the PMT 202 is illustrated in FIGS. 2A-2C as including a single dynode chain 210, it is noted herein the PMT 202 may include any number of dynode chains 210 including 1, 2, up to an N number of dynode chains 210, where each dynode chain 210 includes one or more dynodes. In addition, it is noted herein the dynode chains 210 and the included dynodes may be fully separate (e.g., standalone), may be separate but interweaved, or may be operably coupled together (e.g., shorted together).

In addition, although the PMT 202 is illustrated in FIGS. 2A-2C as including a single photocathode 204, it is noted herein the PMT 202 may include any number of photocathodes 204 including 1, 2, up to an N number of photocathodes 204. In general, any number of photocathodes 204 may lead to any number of dynode chains 210. Therefore, the above description should not be interpreted as a limitation on the scope of the present disclosure but merely an illustration.

Further, although the PMT 202 is illustrated in FIGS. 2A-2C as including a single anode 214, it is noted herein the PMT 202 may include any number of anodes 214 including 1, 2, up to an N number of anodes 214. In general, any number of dynode chains 210 may lead to any number of anodes 214. Therefore, the above description should not be interpreted as a limitation on the scope of the present disclosure but merely an illustration.

It is noted herein "operably coupled" may include, but is not limited to, physically coupled, electrically coupled, optically coupled, communicatively coupled, or the like, for purposes of the present disclosure.

In another embodiment, the assembly 200 includes a digital PMT detector circuit 216. For example, the digital PMT detector circuit 216 may be operably coupled to the anode 214 and configured to generate a final digitized image from the original digitized image taken at the anode 214. In another embodiment, the digital PMT detector circuit 216 may include a logarithmic amplifier (log amp) 218 operably coupled to the anode 214, and an analog-to-digital converter (ADC) 220 operably coupled to the log amp 218. For instance, the anode 214 may transmit a measured signal to the log amp 218, which then passes the signal to the ADC 220 to generate the final digitized image. In one example, the Laplacian may be applied to this final digitized image, resulting in the graphs 100, 110, 120 as illustrated in FIGS. 1A-1C, respectively. It is noted herein the digital PMT detector circuit 216 may be built into the PMT 202 or may be a separate circuit operably coupled to the PMT 202 via one or more stem pins of the PMT 202 when the PMT 202 is seated.

In another embodiment, the assembly 200 includes an analog PMT detector circuit 222. In another embodiment, the analog PMT detector circuit 222 includes an ADC 224. For example, the ADC 224 may include an alternating current (AC)-coupled ADC 224. In another embodiment, the analog PMT detector circuit 222 includes one or more capacitors 226 operably coupled to the ADC 224 (e.g., making it the AC-coupled ADC 224), where the one or more capacitors 226 may filter out DC components.

In one example, where there are 10 dynodes in the dynode chain 210 (e.g., the front dynode 212a, eight dynodes 212b, and the rear dynode 212c), the analog PMT detector circuit 222 may be operably coupled to the eighth dynode D8 (e.g., the dynode 212b positioned two away in the dynode chain 210 from the rear dynode 212c). Here, the photoelectron current 208b may exit the dynode chain 210 at the eighth dynode D8, and pass through the capacitor 226 to reach the AC-coupled ADC 224.

It is noted herein the dynode chain 210 is not limited to the dynodes 212a, 212b, 212c as illustrated in FIGS. 2A-2C, but may instead include any number of dynodes as desired to amplify the photoelectrons 208a, 208b, and/or 208c. Therefore, the above description should not be interpreted as a limitation on the scope of the present disclosure but merely an illustration.

In another embodiment, the analog PMT detector circuit 222 may be operably coupled to a dynode of the dynode chain 210. For example, a voltage signal measured at a dynode 212a, 212b, 212c positioned in the dynode chain 210 prior to the anode 214 may be a derivative of the photoelectron current 208b signal at the dynode 212b. For instance, a capacitor 226 may operate as an analog-space first derivative of the signal (e.g., including photoelectrons 208a, 208b, 208c) of the dynode chain 210. In addition, the AC-coupled ADC 224 may operate as an analog-space second derivative or Laplacian of the signal (e.g., including photoelectrons 208a, 208b, 208c) of the dynode chain 210.

Returning to the ten-dynode example, the analog PMT detector circuit 222 may be operably coupled to the eighth dynode D8. If measured at the eighth dynode D8 as opposed to being measured at the anode 214, the signal at the dynode D8 may have a higher bandwidth than the signal measured at the anode 214 as the photoelectron current 208b has less spread than the photoelectron current 208c at the anode 214. In general, this may be considered true for any measurement of a signal at any dynode to which the analog PMT detector circuit 222 may be operably coupled.

It is noted herein, however, the strength of the resultant signal may be dependent on the dynode of the dynode chain 210 to which the analog PMT detector circuit 222 may be operably coupled. For example, coupling the analog PMT detector circuit 222 to a dynode too far up the dynode chain 210 (e.g., too close to the photocathode 204) may require the measured signal to need an additional boost (e.g., via one or more amplification components), as the photoelectron current 208a or 208b by itself might not be strong enough and the signal would be too small.

In another embodiment, the digitized image taken at the anode 214 is corrected (e.g., including but not limited to, sharpened) by applying the output of the signal measured by the analog PMT detector circuit 222 to the digitized image.

The digitized image may be corrected by subtracting the output of the signal measured by the analog PMT detector circuit 222 from the digitized image. For example, the digitized image may be corrected by subtracting the second derivative or Laplacian measured at the AC-coupled ADC 224 from the digitized image. For instance, the digitized image may be sharpened by subtracting the second derivative or Laplacian measured at the AC-coupled ADC 224 from the digitized image. It is noted herein the second derivative or Laplacian measured at the AC-coupled ADC 224 may be at least one of scaled or shifted prior to being subtracted from the digitized image.

The digitized image may be corrected by multiplying the output of the signal measured by the analog PMT detector circuit 222 and the digitized image. By way of another example, the digitized image may be corrected by multiplying the second derivative or Laplacian measured at the AC-coupled ADC 224 and the digitized image. For instance, the digitized image may be sharpened by multiplying the second derivative or Laplacian measured at the AC-coupled ADC 224 and the digitized image. It is noted herein the second derivative or Laplacian measured at the AC-coupled ADC 224 may be at least one of scaled or shifted prior to being multiplied with the digitized image.

In general, the correcting the digitized image may involve combining the digitized image with the second derivative or Laplacian measured at the AC-coupled ADC 224 via any number or type of mathematical operations.

Figure 3A:
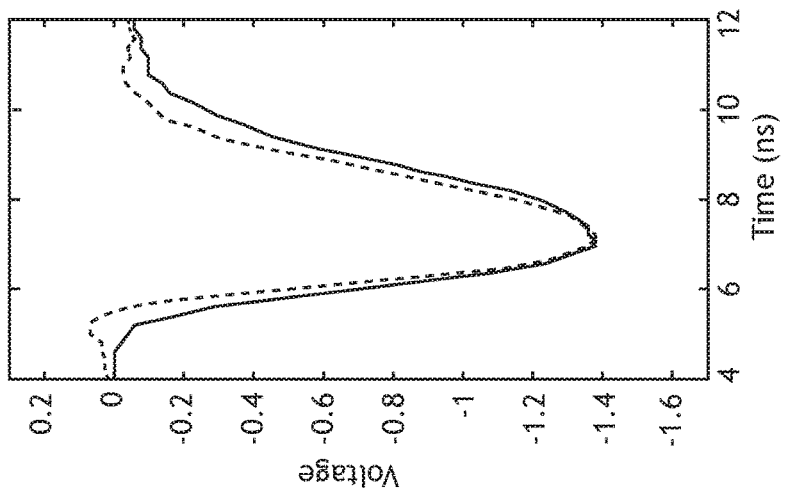
FIG. 3A is a graph illustrating a signal measured at an anode and a signal measured via a Laplacian operator in analog space as a function of voltage versus time, in accordance with one or more embodiments of the present disclosure.
Figure 3B:
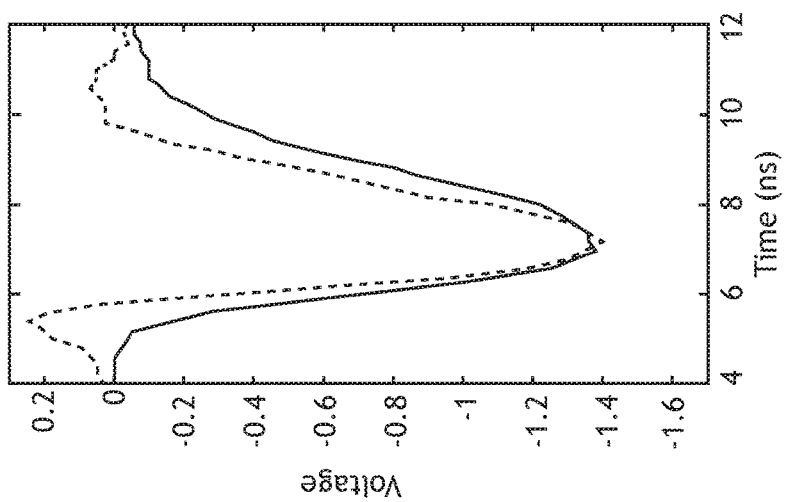
FIG. 3B is a graph illustrating a signal measured at an anode and a signal measured via a Laplacian operator in analog space as a function of voltage versus time, in accordance with one or more embodiments of the present disclosure.
Figure 3C:
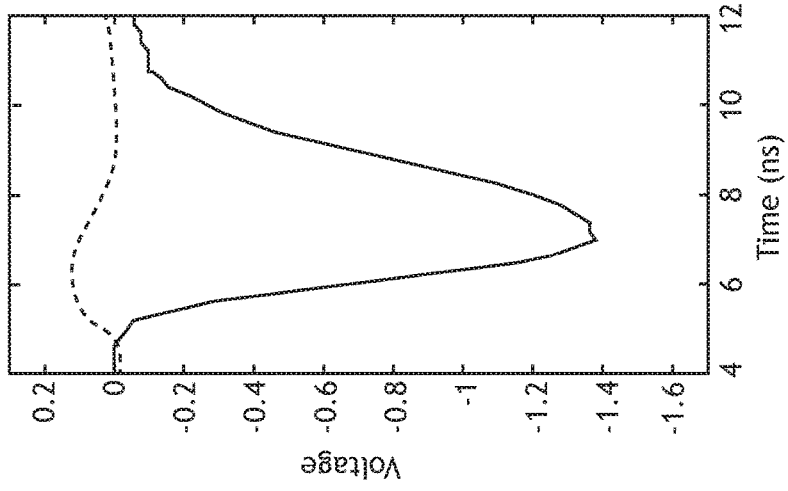
FIG. 3C is a graph illustrating a signal measured at an anode and a signal measured via a Laplacian operator in analog space as a function of voltage versus time, in accordance with one or more embodiments of the present disclosure.

FIGS. 3A-3C illustrate the results of an example application of an analog-space Laplacian to a photoelectron current 208b measured at a dynode 212b. For instance, FIG. 3A is a graph 300 illustrating an anode signal 302 and an analog-space dynode signal 304 of the AC-coupled voltage taken at a particular dynode of the dynode chain 210, as a function of voltage (V) versus time (in nanoseconds (ns)). In addition, FIG. 3B is a graph 310 illustrating the anode signal 302 and a processed (e.g., vertical-scaled and aligned) version of the analog-space dynode signal 312, as a function of voltage (V) versus time (ns). Further, FIG. 1C is a graph 320 illustrating the anode signal 302 and a compensated signal 322, where the compensated signal 322 is generated by subtracting the vertical-scaled and aligned analog-space dynode signal 312 (e.g., per EQ. 2, above) from the anode signal 302, as a function of voltage (V) versus time (ns).

In particular, the compensated signal 322 may be representative of a higher bandwidth of signal from the PMT 202. In addition, the compensated signal 322 may be sharper as an image, as compared to the anode signal 302. These, in part, are due to the lack of noise in the analog-space dynode signal 304 of the AC-coupled voltage, due to the direct measuring of the Laplacian as opposed to the applying of EQ. 1, above, to the digitized image from the anode 214.

Figure 4:
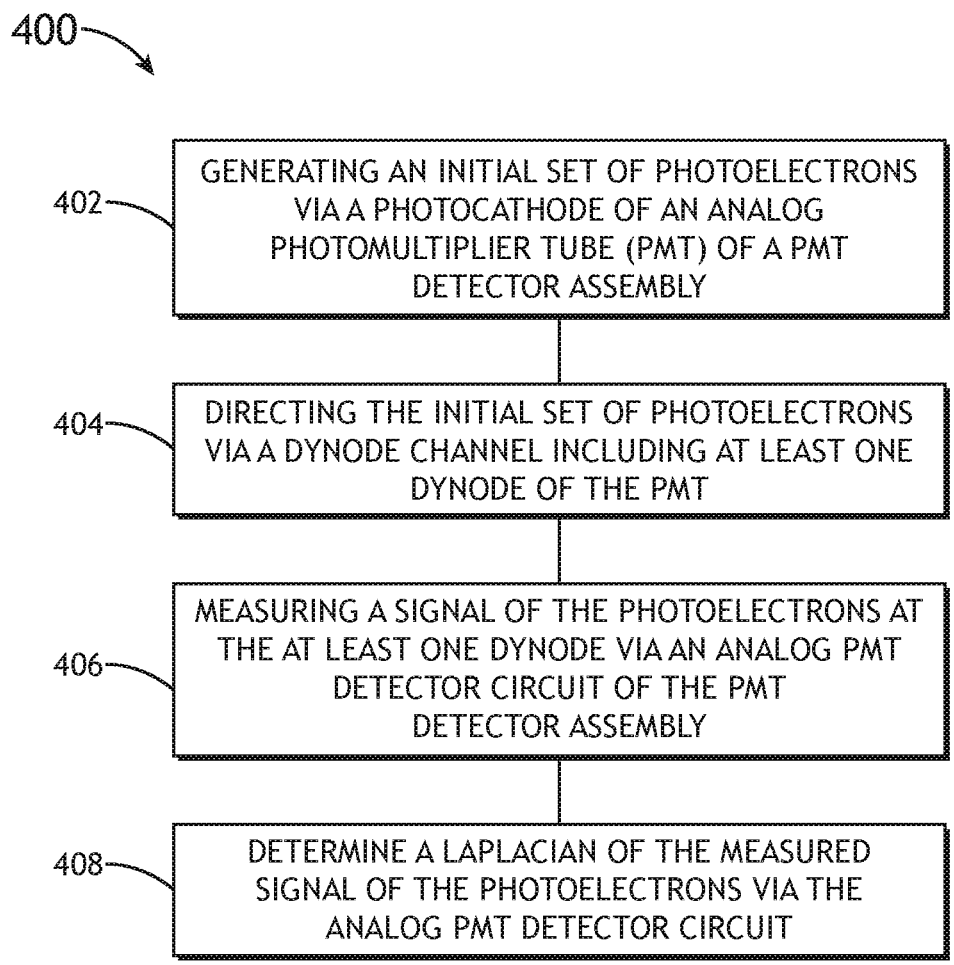
FIG. 4 is a method or process for using a photomultiplier tube detector assembly including a Laplacian operator in analog space, in accordance with one or more embodiments of the present disclosure.

FIG. 4 illustrates a method or process 400, in accordance with one or more embodiments of the present disclosure.

In a step 402, an initial set of photoelectrons may be generated via a photocathode of an analog photomultiplier tube (PMT) of a PMT detector assembly. Photons 206 may be absorbed by the photocathode 204 to generate the initial set of photoelectrons 208a. For example, the photons 206 may be absorbed by the photocathode 204, which may then emit the initial set of photoelectrons 208a.

In a step 404, the initial set of photoelectrons may be directed via a dynode chain including at least one dynode of the PMT. The dynode chain 210 may include dynodes 212a, 212b and/or 212c configured to receive the initial set of photoelectrons 208a and direct the initial set of photoelectrons 208a to the anode 214 via the dynode chain 210. It is noted herein the directed initial set of photoelectrons 208b may directly impinge on the anode 214, or may be amplified by at least one dynode 212b and/or a dynode 212c to generate one or more at least one set of photoelectrons 208b or a set of photoelectrons 208c, respectively, prior to reaching the anode 214. In another embodiment, the anode 214 takes a digitized image based on the measured signal of the dynode chain 210. In another embodiment, the digital PMT detector circuit 216 may generate a final digitized image from the original digitized image taken at the anode 214.

In a step 406, a signal of the photoelectrons at the least one dynode may be measured via an analog PMT detector circuit of the PMT detector assembly. The analog PMT detector circuit 222 including the capacitor 226 and the AC-coupled ADC 224 may be operably coupled to the dynodes 212a, 212b and/or 212c of the dynode chain 210. It is noted herein the analog PMT detector circuit 222 may be operably coupled to any dynode of the dynode chain 210.

In a step 408, a Laplacian of the measured signal of the photoelectrons may be determined via the analog PMT detector circuit. The capacitor 226 may operate as an analog-space equivalent to the first derivative as performed in the digital space. The AC-coupled ADC 224 may operate as an analog-space equivalent to the Laplacian as performed in the digital space. In another embodiment, the digitized image taken at the anode 214 is corrected (e.g., including, but not limited to, sharpened) by applying the output of the signal measured by the analog PMT detector circuit 222 to the digitized image.

The digitized image may be corrected by subtracting the output of the signal measured by the analog PMT detector circuit 222 from the digitized image. For example, the digitized image may be corrected by subtracting the second derivative or Laplacian measured at the AC-coupled ADC 224 from the digitized image. For instance, the digitized image may be sharpened by subtracting the second derivative or Laplacian measured at the AC-coupled ADC 224 from the digitized image. It is noted herein the second derivative or Laplacian measured at the AC-coupled ADC 224 may be at least one of scaled or shifted prior to being subtracted from the digitized image.

The digitized image may be corrected by multiplying the output of the signal measured by the analog PMT detector circuit 222 and the digitized image. By way of another example, the digitized image may be corrected by multiplying the second derivative or Laplacian measured at the AC-coupled ADC 224 and the digitized image. For instance, the digitized image may be sharpened by multiplying the second derivative or Laplacian measured at the AC-coupled ADC 224 and the digitized image. It is noted herein the second derivative or Laplacian measured at the AC-coupled ADC 224 may be at least one of scaled or shifted prior to being multiplied with the digitized image.

In general, the correcting the digitized image may involve combining the digitized image with the second derivative or Laplacian measured at the AC-coupled ADC 224 via any number or type of mathematical operations.

Figure 5:
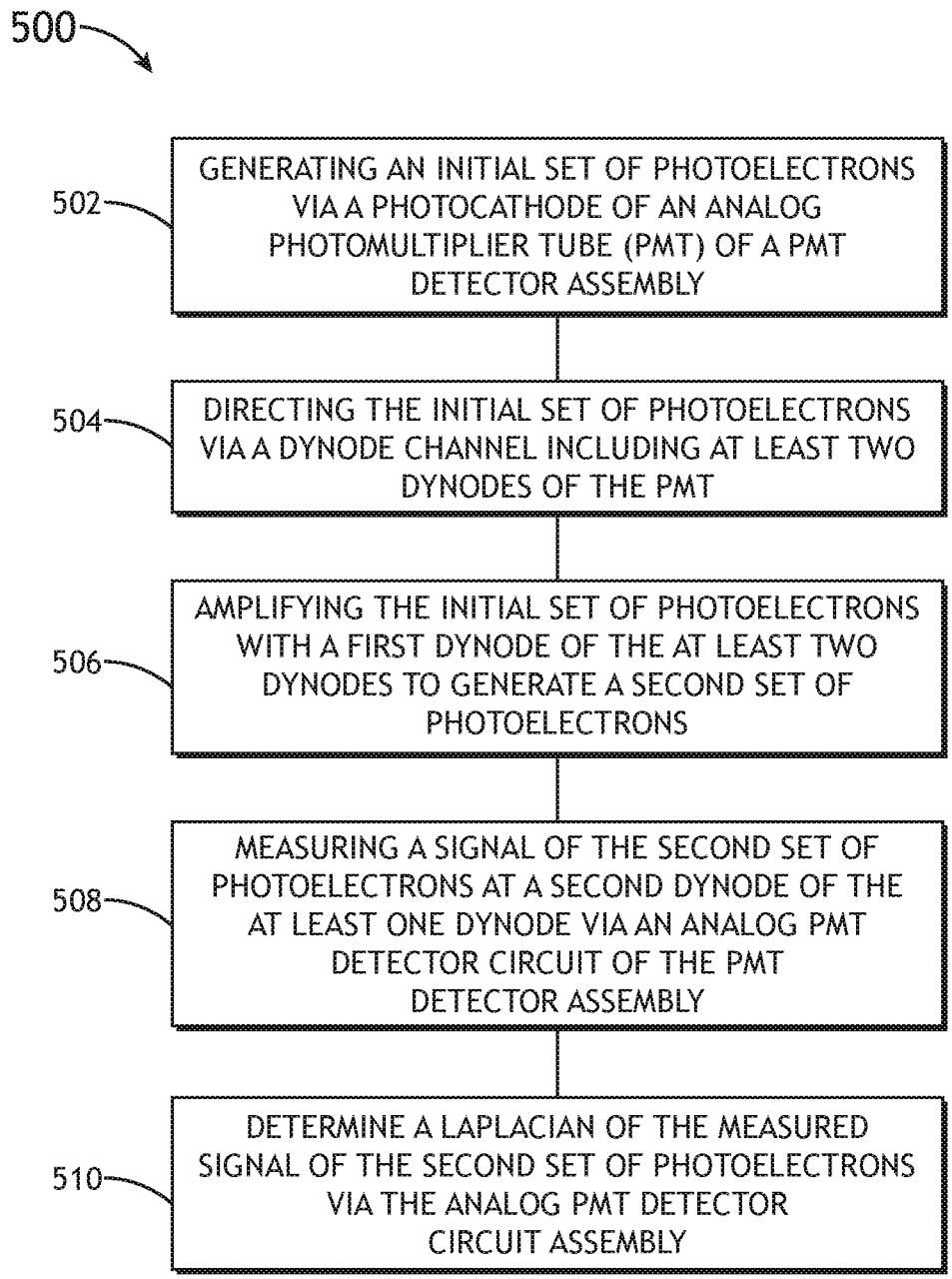
FIG. 5 is a method or process for using a photomultiplier tube detector assembly including a Laplacian operator in analog space, in accordance with one or more embodiments of the present disclosure.

FIG. 5 illustrates a method or process 500, in accordance with one or more embodiments of the present disclosure.

In a step 502, an initial set of photoelectrons may be generated via a photocathode of an analog photomultiplier tube (PMT) of a PMT detector assembly. Photons 206 may be absorbed by the photocathode 204 to generate the initial set of photoelectrons 208a. For example, the photons 206 may be absorbed by the photocathode 204, which may then emit the initial set of photoelectrons 208a.

In a step 504, the initial set of photoelectrons may be directed via a dynode chain 210 including at least two dynodes of the PMT. The dynode chain 210 may include a dynode 212a and at least one dynode 212b. The dynode 212a may be configured to receive the initial set of photoelectrons 208a and amplify the photoelectrons 208a to generate at least a second set of photoelectrons 208b, where the at least the second set of photoelectrons 208b includes a greater number of photoelectrons than the initial set of photoelectrons 208a.

In a step 506, the initial set of photoelectrons may be amplified with a first dynode of the at least two dynodes to form a second set of photoelectrons 208b. The dynode 212a may be configured to receive the initial set of photoelectrons 208a and amplify the photoelectrons 208a to generate at least a second set of photoelectrons 208b, where the at least the second set of photoelectrons 208b includes a greater number of photoelectrons than the initial set of photoelectrons 208a. The at least one dynode 210b may be configured to receive the second set of photoelectrons 208b and direct the second set of photoelectrons 208b to the anode 214 via the dynode chain 210. It is noted herein the directed second set of photoelectrons 208b may directly impinge on the anode 214, or may be further amplified by one or more additional dynodes 212b and/or a dynode 212c to generate one or more additional sets of photoelectrons 208b or a set of photoelectrons 208c, respectively, prior to reaching the anode 214. In another embodiment, the anode 214 takes a digitized image based on the measured signal of the dynode chain 210. In another embodiment, the digital PMT detector circuit 216 may generate a final digitized image from the original digitized image taken at the anode 214.

In a step 508, a signal of the second set of photoelectrons 208b at a second dynode 212b of the at least one dynode may be measured via an analog PMT detector circuit 222 of the PMT detector assembly 200. The analog PMT detector circuit 222 including the capacitor 226 and the AC-coupled ADC 224 may be operably coupled to a dynode 212b of the dynode chain 210. It is noted herein the analog PMT detector circuit 222 may be operably coupled to any dynode of the dynode chain 210.

In a step 510, a Laplacian of the measured signal of the second set of photoelectrons 208b may be determined via the analog PMT detector circuit 222. The capacitor 226 may operate as an analog-space equivalent to the first derivative as performed in the digital space. The AC-coupled ADC 224 may operate as an analog-space equivalent to the Laplacian as performed in the digital space. In another embodiment, the digitized image taken at the anode 214 is corrected (e.g., including, but not limited to, sharpened) by applying the output of the signal measured by the analog PMT detector circuit 222 to the digitized image.

The digitized image may be corrected by subtracting the output of the signal measured by the analog PMT detector circuit 222 from the digitized image. For example, the digitized image may be corrected by subtracting the second derivative or Laplacian measured at the AC-coupled ADC 224 from the digitized image. For instance, the digitized image may be sharpened by subtracting the second derivative or Laplacian measured at the AC-coupled ADC 224 from the digitized image. It is noted herein the second derivative or Laplacian measured at the AC-coupled ADC 224 may be at least one of scaled or shifted prior to being subtracted from the digitized image.

The digitized image may be corrected by multiplying the output of the signal measured by the analog PMT detector circuit 222 and the digitized image. By way of another example, the digitized image may be corrected by multiplying the second derivative or Laplacian measured at the AC-coupled ADC 224 and the digitized image. For instance, the digitized image may be sharpened by multiplying the second derivative or Laplacian measured at the AC-coupled ADC 224 and the digitized image. It is noted herein the second derivative or Laplacian measured at the AC-coupled ADC 224 may be at least one of scaled or shifted prior to being multiplied with the digitized image.

In general, the correcting the digitized image may involve combining the digitized image with the second derivative or Laplacian measured at the AC-coupled ADC 224 via any number or type of mathematical operations.

It is noted herein the methods or processes 400, 500 is not limited to the steps and/or sub-steps provided. The methods or processes 400, 500 may include more or fewer steps and/or sub-steps. In addition, the methods or processes 400, 500 may perform the steps and/or sub-steps simultaneously. Further, the methods or processes 400, 500 may perform the steps and/or sub-steps sequentially, including in the order provided or an order other than provided. Therefore, the above description should not be interpreted as a limitation on the scope of the disclosure but merely an illustration.

Figure 6:
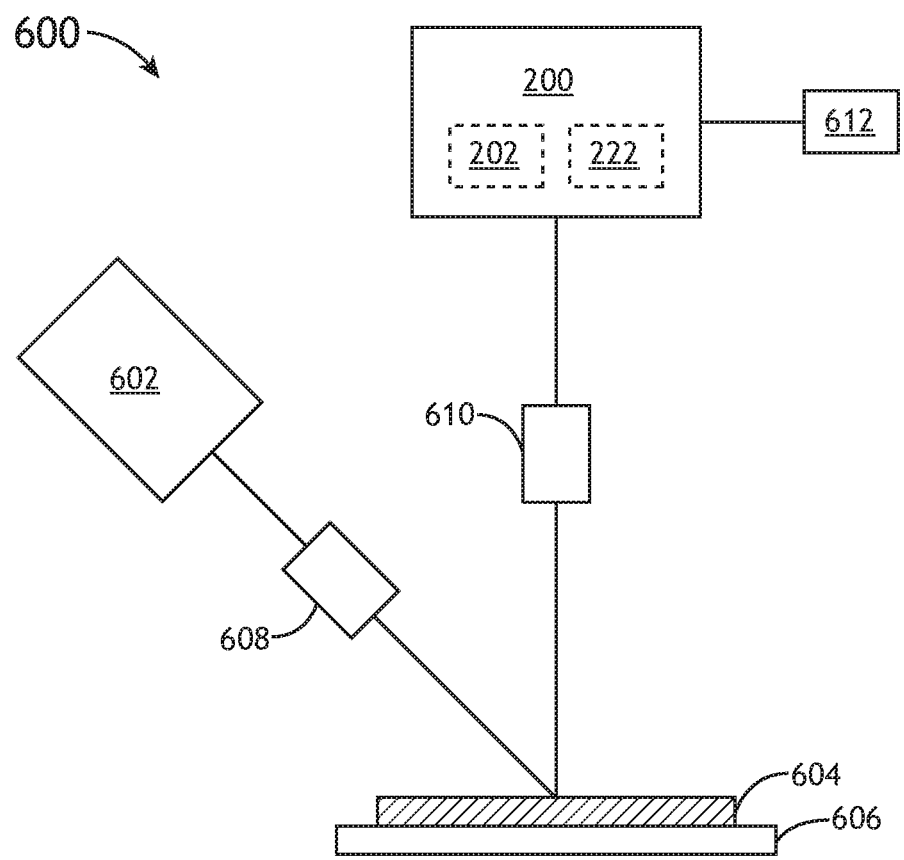
FIG. 6 illustrates a block diagram of a characterization system equipped with a photomultiplier tube detector assembly including a Laplacian operator in analog space, in accordance with one or more embodiments of the present disclosure.

FIG. 6 illustrates a characterization system 600, in accordance with one or more embodiments of the disclosure.

In one embodiment, the characterization system 600 includes the PMT detector assembly 200. For example, the PMT detector assembly 200 may include the PMT 202 or one or more components of the PMT 202, the digital PMT detector circuit 216 or one or more components of the digital PMT detector circuit 216, and/or the analog PMT detector circuit 222 or one or more components of the analog PMT detector circuit 222.

In another embodiment, the characterization system 600 includes an illumination source 602 configured to illuminate a portion of a surface of a sample 604 (e.g., semiconductor wafer) disposed on a sample stage 606. As used throughout the present disclosure, the term "sample" in general refers to a substrate formed of a semiconductor or non-semiconductor material (e.g., a wafer, or the like). For example, a semiconductor or non-semiconductor material may include, but is not limited to, monocrystalline silicon, gallium arsenide, and indium phosphide. A sample may include one or more layers. For example, such layers may include, but are not limited to, a resist (including a photoresist), a dielectric material, a conductive material, and a semiconductive material. Many different types of such layers are known in the art, and the term sample as used herein is intended to encompass a sample on which all types of such layers may be formed. One or more layers formed on a sample may be patterned or unpatterned. For example, a sample may include a plurality of dies, each having repeatable patterned features. Formation and processing of such layers of material may ultimately result in completed devices. Many different types of devices may be formed on a sample, and the term sample as used herein is intended to encompass a sample on which any type of device known in the art is being fabricated. Further, for the purposes of the present disclosure, the term sample and wafer should be interpreted as interchangeable. In addition, for the purposes of the present disclosure, the terms patterning device, mask and reticle should be interpreted as interchangeable.

In general, the characterization system 600 may be configured to operate in conjunction with any illumination source 602 known in the art. For example, the illumination source 602 used to illuminate the surface of the sample may include, but is not limited to, a broad band light source (e.g., xenon lamp, laser-sustained plasma lamp and the like). For example, the illumination source 602 used to illuminate the surface of the sample may include, but is not limited to, a narrow band light source (e.g., one or more lasers).

In another embodiment, the characterization system 600 includes one or more illumination optics 608 disposed within an illumination pathway between the illumination source 602 and the sample 604. The illumination optics 608 may be configured to direct and focus the illumination onto the sample surface. In general, the illumination optics 608 of the inspection system 600 may include any illumination optics 608 known in the art suitable for directing, processing, and/or focusing the illumination emanating from the illumination source 602 onto a portion of the surface of the sample 604. For example, the set of illumination optics 608 may include, but are not limited to, one or more lenses, one or more mirrors, one or more beam splitters, one or more polarizer elements, and the like.

In another embodiment, the characterization system 600 includes one or more collection optics 610 disposed within a collection pathway between the sample 604 and the PMT detector assembly 200. The one or more collection optics 610 may be configured to direct and focus at least a portion of the light scattered from the surface of the sample 604 onto the PMT photocathode 204 of the PMT detector assembly 200 (e.g., an input of the PMT detector assembly 200). The collection optics 610 of the characterization system 600 may include any collection optics known in the art suitable for directing, processing, and/or focusing light scattered from the surface of the sample 604 onto the multi-channel PMT detector assembly 100. For example, the set of collection optics 610 may include, but are not limited to, one or more lenses, one or more mirrors, one or more beam splitters, one or more polarizer elements, and the like.

In another embodiment, the PMT detector assembly 200 is configured to detect the photons 206 from a surface of the sample 604 through the collection optics 610, following the impinging of illumination from the illumination source 602 on the sample 604 via the illumination optics 608.

It is noted herein one or more of the illumination source 602, the illumination optics 608, the collection optics 610, and the multi-channel PMT detector assembly 100 may be arranged in a dark field configuration such that the inspection system 600 operates as a dark field inspection system. In addition, it is noted herein the inspection system 600 may be configured to operate as a bright field inspection system.

In another embodiment, the characterization system 600 includes a controller 612 operably coupled to the characterization system 600. In another embodiment, the controller 612 is operably coupled to one or more components of the characterization system 600. For example, the controller 612 may be operably coupled to the illumination source 602, the sample stage 606, the PMT detector assembly 200, and/or one or more additional components. In this regard, the controller 612 may direct any of the components of the characterization system 600 and/or any components of the illumination source 602, the sample stage 606, the PMT detector assembly 200, and/or the one or more additional components to carry out any one or more of the various functions described throughout the present disclosure.

In another embodiment, the characterization system 600 may include the controller 612 operably coupled to a server via a network. In another embodiment, controller 612 includes the one or more processors and memory. In another embodiment, the one or more processors may be configured to execute a set of program instructions stored in memory, wherein the set of program instructions are configured to cause the one or more processors to carry out the steps of the present disclosure. It is noted herein that the discussion herein regarding server, one or more processors, and memory may also be regarded as applying to controller 612, one or more processors, and memory, unless noted otherwise herein.

It is noted herein that the one or more components of the characterization system 600 may be operably coupled to the various other components of the characterization system 600 in any manner known in the art. For example, the one or more processors may be communicatively coupled to each other and other components via a wireline (e.g., copper wire, fiber optic cable, and the like) or wireless connection (e.g., RF coupling, IR coupling, data network communication (e.g., WiFi, WiMax, Bluetooth and the like)).

In one embodiment, the one or more processors may include any one or more processing elements known in the art. In this sense, the one or more processors may include any microprocessor-type device configured to execute software algorithms and/or instructions. In one embodiment, the one or more processors may consist of a desktop computer, mainframe computer system, workstation, image computer, parallel processor, or other computer system (e.g., networked computer) configured to execute a program configured to operate the characterization system 600, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors. In general, the term "processor" may be broadly defined to encompass any device having one or more processing elements, which execute program instructions from memory. Moreover, different subsystems of the characterization system 600 may include processor or logic elements suitable for carrying out at least a portion of the steps described throughout the present disclosure. Therefore, the above description should not be interpreted as a limitation on the present disclosure but merely an illustration.

The memory may include any storage medium known in the art suitable for storing program instructions executable by the associated one or more processors and the data received from the transmitting devices. For example, the memory may include a non-transitory memory medium. For instance, the memory may include, but is not limited to, a read-only memory (ROM), a random access memory (RAM), a magnetic or optical memory device (e.g., disk), a magnetic tape, a solid state drive and the like. In another embodiment, the memory is configured to store data including, but not limited to, entity data, association data (e.g., spatial relationship data), operations data, GPS data, time-stamped data, geo-fenced data, and the like received from transmitting devices. It is further noted that memory may be housed in a common controller housing with the one or more processors. In an alternative embodiment, the memory may be located remotely with respect to the physical location of the processors, server, controller, and the like. In another embodiment, the memory maintains program instructions for causing the one or more processors to carry out the various steps described through the present disclosure.

All of the methods or processes described herein may include storing results of one or more steps of the method or process embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

In this regard, the characterization system 600 uses the ADC-coupled signal from a dynode in the dynode chain 210, as opposed to the signal taken at the anode 214. Measuring the ADC-coupled signal from the dynode in the dynode chain 210 may allow for the avoiding of a known set of issues such as noise in the final signal, as the final signal is not being boosted when determining the Laplacian from the digitized image; instead, the Laplacian is directly measured with the ADC-coupled signal. The PMT detector assembly 200 may have a higher bandwidth due to less spread occurring at the dynode in the dynode chain 210 versus the anode 214, leading to an increased throughput of the characterization system 600 without degrading resolution, such that the resultant image may be sharper.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are in general intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A detector assembly comprising:
  a photomultiplier tube comprising:
    a photocathode configured to absorb photons, the photocathode further configured to emit an initial set of photoelectrons in response to an absorption of the photons;
      a dynode chain, wherein the dynode chain includes a plurality of dynodes, wherein the dynode chain is configured to:
      receive the initial set of photoelectrons;
      generate at least one amplified set of photoelectrons from the initial set of photoelectrons, wherein the at least one amplified set of photoelectrons includes a greater number of photoelectrons than the initial set of photoelectrons; and
      direct the at least one amplified set of photoelectrons; and
    an anode configured to receive the at least one amplified set of photoelectrons directed by the dynode chain, wherein the received at least one amplified set of photoelectrons are measured at the anode, wherein a digitized image is generated based on the measured at least one amplified set of photoelectrons; and
  an analog photomultiplier tube detector circuit configured to measure a signal of the dynode chain, comprising:
    a capacitor operably coupled to at least one dynode of the plurality of dynodes; and
    an alternating current (AC)-coupled analog-to-digital converter ADC operably coupled to the capacitor,
    wherein the digitized image is corrected by applying an output of the signal measured by the analog photomultiplier tube detector circuit to the digitized image, wherein a voltage measurement at the capacitor represents a first derivative of the signal of the dynode chain.

2. The detector assembly of claim 1, wherein the plurality of dynodes each include at least one of a flat surface or a curved surface.

3. The detector assembly of claim 1, wherein a voltage measurement at the AC-coupled analog-to-digital converter represents a second derivative or Laplacian in analog space of the signal of the dynode chain.

4. The detector assembly of claim 3, wherein the digitized image is corrected by subtracting the second derivative or Laplacian signal measured at the AC-coupled analog-to-digital converter from the digitized image.

5. The detector assembly of claim 4, wherein the digitized image is sharpened by subtracting the second derivative or Laplacian signal measured at the AC-coupled analog-to-digital converter from the digitized image.

6. The detector assembly of claim 3, wherein the digitized image is corrected by multiplying the second derivative or Laplacian signal measured at the AC-coupled analog-to-digital converter and the digitized image.

7. The detector assembly of claim 6, wherein the digitized image is sharpened by multiplying the second derivative or Laplacian signal measured at the AC-coupled analog-to-digital converter and the digitized image.

8. The detector assembly of claim 1, wherein the plurality of dynodes includes an initial dynode, wherein the initial dynode is configured to receive the initial set of photoelectrons, wherein the initial dynode is configured to amplify the initial set of photoelectrons to generate a first amplified set of photoelectrons of the at least one amplified set of photoelectrons, wherein the first amplified set of photoelectrons includes the greater number of photoelectrons than the initial set of photoelectrons.

9. The detector assembly of claim 8, wherein the plurality of dynodes includes at least one intermediate dynode, wherein the at least one intermediate dynode is configured to receive the first amplified set of photoelectrons, wherein the at least one intermediate dynode is configured to further amplify the first amplified set of photoelectrons to generate at least one intermediate amplified set of photoelectrons of the at least one amplified set of photoelectrons, wherein the at least one intermediate amplified set of photoelectrons includes a greater number of photoelectrons than the first amplified set of photoelectrons.

10. The detector assembly of claim 9, wherein the capacitor is operably coupled to the at least one intermediate dynode.

11. The detector assembly of claim 9, wherein the plurality of dynodes includes a final dynode, wherein the final dynode is configured to receive the at least one intermediate amplified set of photoelectrons, wherein the final dynode is configured to further amplify the at least one intermediate amplified set of photoelectrons to generate a final amplified set of photoelectrons of the at least one amplified set of photoelectrons, wherein the final dynode is configured to direct the final amplified set of photoelectrons to the anode.

12. The detector assembly of claim 1, wherein the photocathode is configured to absorb photons from at least one of oblique incident angles or normal incident angles.

13. The detector assembly of claim 1, further comprising:
  a digital photomultiplier tube detector circuit operably coupled to the anode and configured to measure the at least one amplified set of photoelectrons.

14. The detector assembly of claim 13, wherein the digital photomultiplier tube detector circuit comprises:
  a logarithmic amplifier operably coupled to the anode; and
  an analog-to-digital converter operably coupled to the logarithmic amplifier.

15. The detector assembly of claim 1, wherein the photomultiplier tube is a head-on photomultiplier tube.

16. The detector assembly of claim 1, wherein the photomultiplier tube is a side-on photomultiplier tube.

17. A characterization system comprising:
  an illumination source configured to illuminate a portion of a sample surface; and
  a detector assembly comprising:
    a photomultiplier tube comprising:
      a photocathode configured to absorb photons, the photocathode further configured to emit an initial set of photoelectrons in response to an absorption of the photons;
      a dynode chain, wherein the dynode chain includes a plurality of dynodes, wherein the dynode chain is configured to:
        receive the initial set of photoelectrons;

generate at least one amplified set of photoelectrons from the initial set of photoelectrons, wherein the at least one amplified set of photoelectrons includes a greater number of photoelectrons than the initial set of photoelectrons; and direct the at least one amplified set of photoelectrons; and an anode configured to receive the at least one amplified set of photoelectrons directed by the dynode chain, wherein the received at least one amplified set of photoelectrons are measured at the anode, wherein a digitized image is generated based on the measured at least one amplified set of photoelectrons; and an analog photomultiplier tube detector circuit configured to measure a signal of the dynode chain, comprising:

a capacitor operably coupled to at least one dynode of the plurality of dynodes; and an alternating current (AC)-coupled analog-to-digital converter (ADC) operably coupled to the capacitor, wherein the digitized image is corrected by applying an output of the signal measured by the analog photomultiplier tube detector circuit to the digitized image, wherein a voltage measurement at the capacitor represents a first derivative of the signal of the dynode chain.

18. The system of claim 17, wherein the characterization system includes a dark field inspection system.

19. The system of claim 17, wherein the characterization system includes a bright field inspection system.

20. The system of claim 17, wherein a voltage measurement at the AC-coupled analog-to-digital converter represents a second derivative or Laplacian in analog space of the signal of the dynode chain.

21. The system of claim 20, wherein the digitized image is corrected by subtracting the second derivative or Laplacian signal measured at the AC-coupled analog-to-digital converter from the digitized image.

22. The system of claim 21, wherein the digitized image is sharpened by subtracting the second derivative or Laplacian signal measured at the AC-coupled analog-to-digital converter from the digitized image.

23. The system of claim 20, wherein the digitized image is corrected by multiplying the second derivative or Laplacian signal measured at the AC-coupled analog-to-digital converter and the digitized image.

24. The system of claim 23, wherein the digitized image is sharpened by multiplying the second derivative or Laplacian signal measured at the AC-coupled analog-to-digital converter and the digitized image.

25. The system of claim 17, further comprising:
a set of illumination optics configured to direct and focus the illumination onto the sample surface.

26. The system of claim 17, further comprising:
a set of collection optics configured to direct and focus at least a portion of light scattered from the surface of the sample to an input of the detector assembly.

27. The system of claim 17, wherein the illumination source includes a narrow band source.

28. The system of claim 17, wherein the illumination source includes a broad band source.

29. A detector assembly comprising:
a photomultiplier tube comprising:

a photocathode configured to absorb photons, the photocathode further configured to emit an initial set of photoelectrons in response to an absorption of the photons;

a dynode chain configured to receive the initial set of photoelectrons, wherein the dynode chain includes a plurality of dynodes, wherein the plurality of dynodes comprises:

an initial dynode, wherein the initial dynode is configured to receive the initial set of photoelectrons, wherein the initial dynode is configured to amplify the initial set of photoelectrons to generate a first amplified set of photoelectrons, wherein the first amplified set of photoelectrons includes a greater number of photoelectrons than the initial set of photoelectrons;

at least one intermediate dynode, wherein the at least one intermediate dynode is configured to receive the first amplified set of photoelectrons, wherein the at least one intermediate dynode is configured to further amplify the first amplified set of photoelectrons to generate at least one intermediate amplified set of photoelectrons, wherein the at least one intermediate amplified set of photoelectrons includes a greater number of photoelectrons than the first amplified set of photoelectrons; and a final dynode, wherein the final dynode is configured to receive the at least one intermediate amplified set of photoelectrons, wherein the final dynode is configured to further amplify the at least one intermediate amplified set of photoelectrons to generate a final amplified set of photoelectrons, wherein the final set of photoelectrons includes a greater number of photoelectrons than the at least one intermediate amplified set of photoelectrons; and an anode configured to receive the final amplified set of photoelectrons directed by the final dynode from the dynode chain, wherein the received final amplified set of photoelectrons is measured at the anode, wherein a digitized image is generated based on the measured final amplified set of photoelectrons; and an analog photomultiplier tube detector circuit configured to measure a signal of the dynode chain, comprising:

a capacitor operably coupled to the at least one intermediate dynode; and an alternating current (AC)-coupled analog-to-digital converter (ADC) operably coupled to the capacitor, wherein the digitized image is corrected by applying an output of the signal measured by the analog photomultiplier tube detector circuit to the digitized image, wherein a voltage measurement at the capacitor represents a first derivative of the signal of the dynode chain.

30. The detector assembly of claim 29, wherein a voltage measurement at the AC-coupled analog-to-digital converter represents a second derivative or Laplacian in analog space of the signal of the dynode chain.

31. The detector assembly of claim 30, wherein the digitized image is corrected by subtracting the second derivative or Laplacian signal measured at the AC-coupled analog-to-digital converter from the digitized image.

32. The detector assembly of claim 31, wherein the digitized image is sharpened by subtracting the second derivative or Laplacian signal measured at the AC-coupled analog-to-digital converter from the digitized image.

33. The detector assembly of claim 30, wherein the digitized image is corrected by multiplying the second derivative or Laplacian signal measured at the AC-coupled analog-to-digital converter and the digitized image.

34. The detector assembly of claim 33, wherein the digitized image is sharpened by multiplying the second derivative or Laplacian signal measured at the AC-coupled analog-to-digital converter and the digitized image.

* * * * *